Nov. 14, 1967     W. H. ROBINSON     3,353,016
COMBINATION ACOUSTICAL AND LIGHTING FIXTURE
Filed Dec. 23, 1965     2 Sheets-Sheet 1
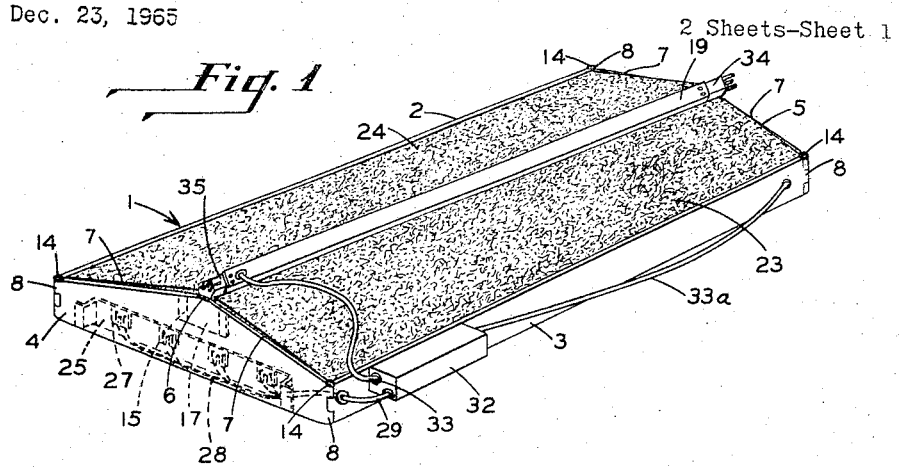
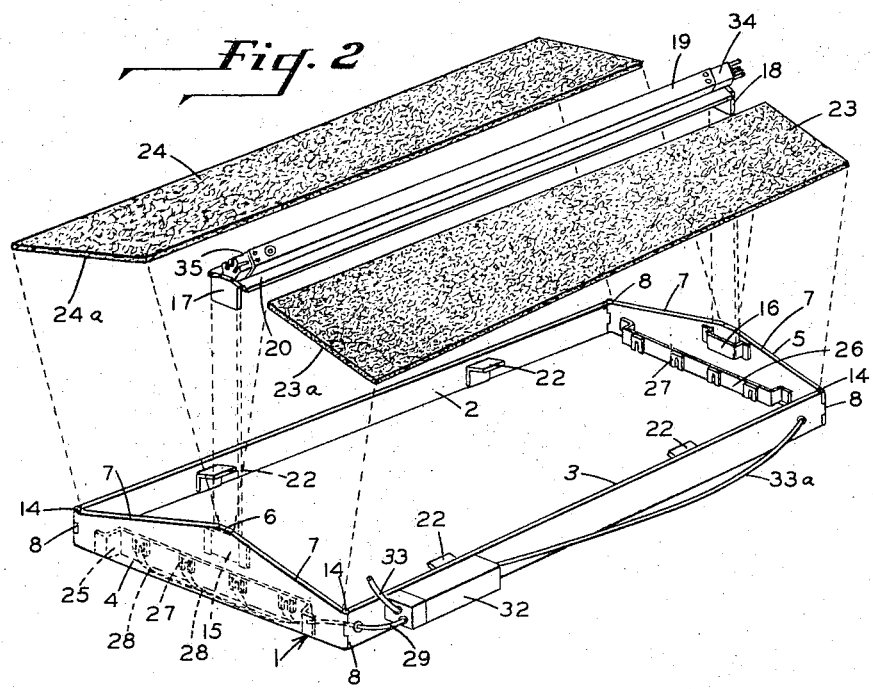
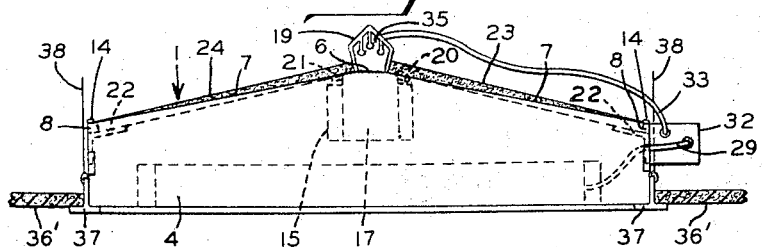
INVENTOR
WILLIAM H. ROBINSON
BY
*George L. Herr*
ATTORNEY

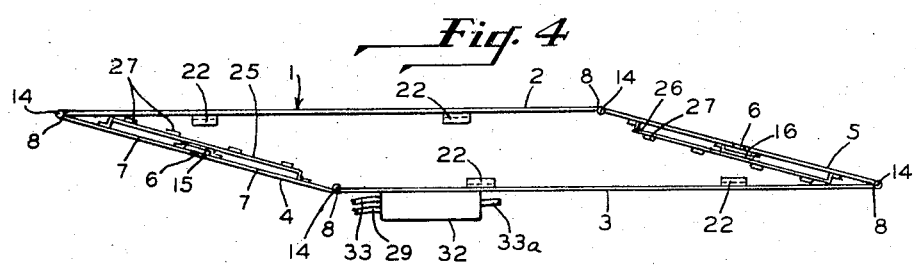
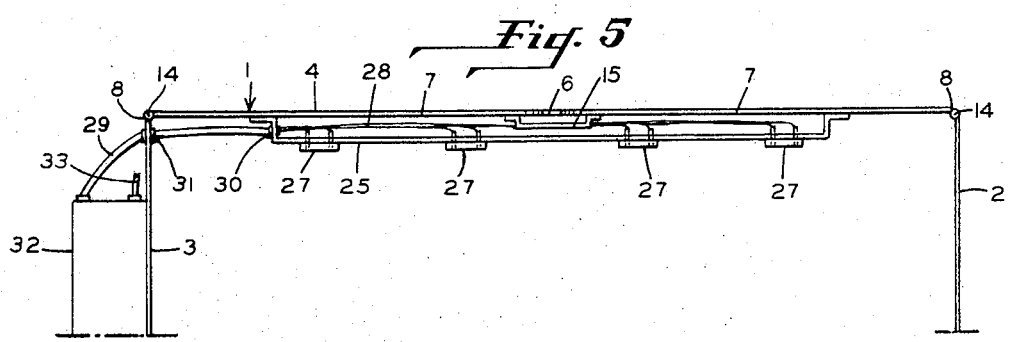
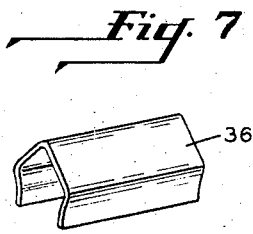
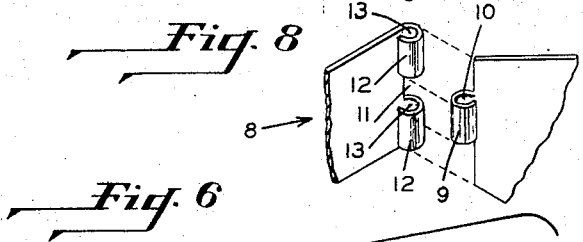
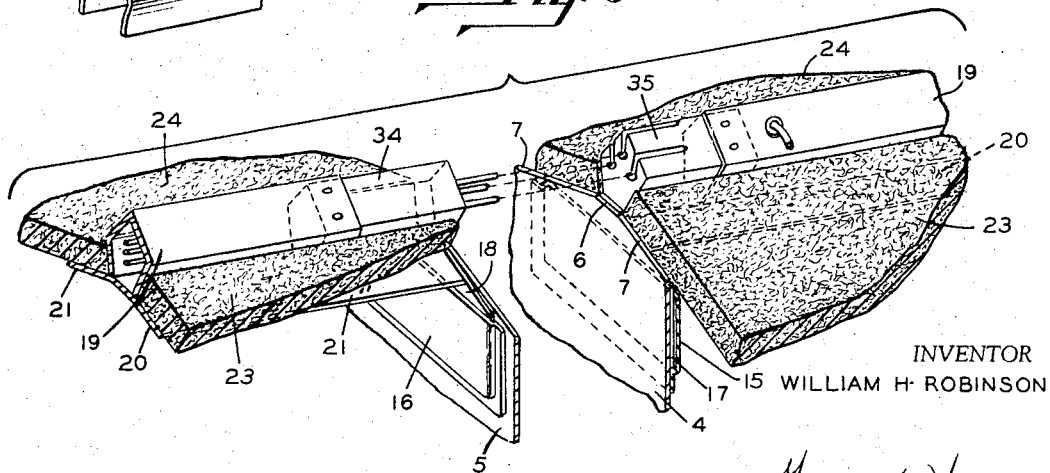
INVENTOR
WILLIAM H. ROBINSON

United States Patent Office 3,353,016
Patented Nov. 14, 1967

3,353,016
COMBINATION ACOUSTICAL AND
LIGHTING FIXTURE
William H. Robinson, Lancaster, Pa., assignor to Armstrong Cork Company, Lancaster, Pa., a corporation of Pennsylvania
Filed Dec. 23, 1965, Ser. No. 515,911
10 Claims. (Cl. 240—51.11)

This invention relates to lighting fixtures and more particularly to lighting fixtures of the type adapted for use in fluorescent lighting arrangements. Still more particularly, this invention relates to a combined acoustical and lighting assembly wherein lay-in panels of acoustical correction material having a light-reflecting bottom surface are supported in angular relationship to each other on a foldable light fixture frame to serve as a reflecting means for the light source as well as a sound-absorbing element. The advantages of a light fixture of this type are readily apparent. Such a structure would reduce the expense normally incurred by the use of the usual enameled steel as a light-reflecting means. A hinged fixture such as that of this invention would require smaller package sizes, reduce shipping costs, reduce assembly and installation time and expense, and eliminate almost 100% of the amount of acoustical ceiling area normally lost when conventional fluorescent light fixtures are installed therein. Attempts have been made in the past to provide a lighting fixture which would meet the above qualifications. For example, U.S. Patent 2,830,330 proposes the use of brackets mounted on a ballast box and having arms with upturned flanges to support acoustical panels which also serve as reflecting means for the light source.

Lighting fixtures comprising a plurality of individual elements adapted to be assembled on the job have also been proposed. U.S. Patent 3,019,333 shows an example of such an arrangement. Lighting fixture components utilizing foldable, preformed blanks have also been proposed, as shown in U.S. Patent 3,146,957, as a means of simplifying shipping, forming, installation, etc.

These prior attempts, however, did not solve the problem of providing a foldable lighting fixture which could be mass produced and finished at the factory at a reduced cost, shipped in partially collapsed form, thereby permitting a substantial reduction in the normal size and cost of shipping containers and the space required for shipping them, be assembled on the job, without tools, eliminate the need for metal reflectors, provide a mounting means for lighting-reflecting lay-in acoustical panels, and be installed in an acoustical ceiling with practically no reduction in the effective area thereof.

It is among the objects of this invention to provide a combined lighting and acoustical arrangement which fulfills the above requirements in a simple, effective, and straightforward manner. Specifically, it is an object of this invention to produce a combined lighting fixture and light-reflecting, sound-absorbing unit. It is a further object of this invention to provide a lighting fixture having panels of acoustical material mounted thereon in angular relationship to each other as a reflecting means for the light source. It is a still further object of this invention to provide a light fixture which is economical to manufacture, package, and ship as well as being simple to assemble and install. It is a still further object of this invention to provide a light fixture having a hinged, foldable framework. It is a further object of this invention to provide a light fixture having a snap-in wire raceway which also locks the frame in opened, assembled form.

In the drawings:
FIGURE 1 is a perspective assembly view of the combined lighting fixture and acoustical correction unit of this invention;
FIGURE 2 is an exploded view in perspective of the structure shown in FIGURE 1;
FIGURE 3 is an end view of the combined lighting fixture and acoustical correction unit shown in place in a ceiling suspension system;
FIGURE 4 is a plan view of the frame of the fixture shown in partially collapsed form;
FIGURE 5 is a top plan view of one end of the fixture showing the lamp holders, wire channel and ballast box arrangement;
FIGURE 6 is a perspective view, partially broken away, showing separated portions of two light fixtures including means for electrically connecting them together;
FIGURE 7 is a perspective view of a cover to be used on the connectors shown in FIGURE 6 when they are joined together; and
FIGURE 8 is a perspective view showing one of the frame's hinges with the components in disassembled form.

Referring now to the drawings, the light fixture of this invention as shown in FIGURES 1 and 2 thereof includes a foldable framework 1, having a pair of elongated, flat, rectangularly shaped side members 2 and 3, and a pair of flat end members 4 and 5. The end members 4 and 5 are greater in height at their central portion than the side members 2 and 3 and each has a flattened top portion 6. Top edges 7 of end members 4 and 5 slope downwardly and outwardly from the flattened top portion 6 to a point even with the top edge of the side members 2 and 3. End members 4 and 5 are joined to side members 2 and 3 by hinges 8.

As best seen in FIGURE 8, hinges 8 are formed by providing projections 9 centrally positioned on the ends of end members 4 and 5, which are subsequently rolled to form eyes 10. Side pieces 2 and 3 have centrally located cut out portions 11 on the ends thereof whereby side projections 12 are formed which are also rolled to form eyes 13. The projections 9 and cut out portions 11 are so dimensioned that when they are positioned together, eyes 10 and 13 will align to form the hinges 8. Hinge pins 14 are positioned in the hinges 8 to hold members 2 and 3, and 4 and 5 in assembled form. Various types of hinge pins commercially available may be used, the only requirement being that the pins be of a type which will remain in place until some definite act is performed to remove them.

Rectangularly shaped pockets 15 and 16 are centrally positioned on the inner surface of each of end members 4 and 5 below the flat top portions 6 thereof. Adapted to fit in the pockets 15 and 16 are flat end pieces 17 and 18 which are mounted on the ends of the extending flanged bottom portion of wire raceway 19. End pieces 17 and 18 are provided with flattened centrally located top portions corresponding in size to the flattened top portions of frame end members 4 and 5. The top edges of pieces 17 and 18 slope downwardly from the flattened top portion at an angle slightly greater than that of the sloping top edge portions of end members 4 and 5. When end pieces 17 and 18 are positioned in pockets 15 and 16, the raceway 19 and its end pieces 17 and 18 serve to lock the hinged framework of the fixture 1 in open position. The wire raceway 19 is an elongated channel member which in cross section is generally pentagonal in shape with outwardly and downwardly extending flange portions 20 and 21 along the length of the bottom portion thereof. These flange portions 20 and 21, together with the frame-mounted support brackets 22, constitute the supports upon which lay-in panels 23 and 24 rest.

As shown in FIGURE 2, attached to the inner surface of each of end members 4 and 5 are channel-forming panels 25 and 26 which carry suitable tube supports such as lamp sockets 27. The panels 25 and 26 are mounted on end members 4 and 5 in spaced away relationship to form the channels through which wires 28 from lamp sockets 27 pass. The enlarged top plan view of one end of the fixture shown in FIGURE 5 more clearly shows this arrangement. As shown therein, a suitable conduit 29 carries the wires 28 through an opening 30 in the panel 25 and an opening 31 in side member 3 to a ballast box 32 mounted on the outer side of side member 3. Another conduit 33 (see FIGURE 1) carries wires from the ballast box 32 to the wire raceway 19. As shown in FIGURE 1, conduit 33a carries wires from lamp holders 27 on panel 26 to ballast box 32. For purposes of simplicity, the lighting sources such as fluorescent or other lamps have been omitted as they constitute no part of the invention.

As best shown in FIGURE 6, male and female electrical connectors 34 and 35 are provided at each end of the wire raceway 19 to enable the fixtures to be connected together. Such an arrangement would be usable when the lighting fixtures are to be connected to each other in series relation. A clip-type cover 36 such as shown in FIGURE 7 may be provided for the connectors 34 and 35 when they are joined together, for obvious safety reasons.

FIGURE 4 shows the rectangular framework 1 of the lighting fixture of this invention in partially folded form. The fixture may be mass produced in a factory and shipped in its partially folded form, as shown in FIGURE 1, with the hinge pins 14 in place.

When it is desired to use the fixture, it is merely necessary to open the framework 1 and snap the end pieces 17 and 18 on wire raceway 19 in pockets 15 and 16 located on the inside surfaces of end pieces 4 and 5. This locks the framework 1 in open position. Panels 23 and 24, having light-reflecting lower surfaces, the edges of which are indicated in FIGURE 2 by the numerals 23a and 24a, may then be lain in place as shown in FIGURES 1 and 3, resting on flanges 20 and 21 on wire raceway 19 and brackets 22 on the inside surfaces of the frame's side members 2 and 3.

With the invention as described above, it is apparent that the flush-type fixture can be mounted within a ceiling opening having a suitable fixture supporting ledge extending inwardly from the periphery of the opening. FIGURE 3 shows the fixture as it would be mounted in such an opening in a suspended acoustical ceiling. Such a ceiling normally comprises acoustical panels 36' mounted on a grid of inverted T-members 37 which are normally supported from the true ceiling by suspension members 38 spaced at suitable intervals. In such an installation, it can be seen that the use of a fixture such as the one of this invention permits retention of almost 100% of the acoustical ceiling area, requires no tools or special knowledge to assemble and install, and requires a minimum of work and time.

Obviously, in a lighting fixture such as the one of this invention various types of lay-in material may be used. For example, acoustical panels having openings extending completely through their thickness would serve to allow escape of the heat from the fluorescent tubes which would allow cooler, more efficient operation. Such panels could also be used to allow conditioned air to pass from a plenum chamber above the fixture into the room below. The bottom surfaces of the lay-in panels are preferably provided with a coating of paint to serve as a reflecting means for the light source. However, it will be readily apparent that other material may be used for the light-reflecting surface of the lay-in panels. A decorative sheet of light-reflecting material, for example, could be secured to the bottom surface of the panels for this purpose. Various colors and patterns of lay-in material also could be used for decorative and light control effects. In some cases it may be desirable to use a fire-resistant material. Replacement of panels for any reason could be easily accomplished by merely lifting out one panel and putting another in its place.

The combined lighting fixture and acoustical correction unit of this invention is especially adaptable to situations where it is required that lights be relocated or rearranged without causing any change in the acoustical properties of the ceiling. Conventionally, acoustical units or panels of a length twice their width are employed, that is, 12" x 24". Relocation of a fixture would require merely the removal of a 12" x 24" acoustical tile section from the place where the light was desired, placing the light in the opening and placing the removed acoustical panel in the opening formerly occupied by the lighting fixture. A construction in acccordance with the invention as described above provides all the advantages of the usual light fixture and eliminates the usual disadvantages by being more economical and simpler to manufacture, ship and install, plus having the additional advantage of not reducing the effectiveness of the acoustical ceiling in which it is installed.

I claim:

1. A light fixture comprising side members and end members, means for hingedly connecting said side and end members to form a foldable frame, an elongated channel having a bottom portion, spaced, downwardly extending projections secured to said bottom portion, means forming a pocket on each of at least a pair of opposed end members, said projections being removably positioned in said pockets whereby said frame is held in open position, flanges extending outwardly from the bottom portion of said channel, brackets secured to said side members, at least two panels having light-reflecting lower surfaces, supported by said flanges and brackets on opposite sides of said channel, light supporting socket means carried by said frame.

2. A light fixture according to claim 1 wherein said panels are acoustical.

3. A light fixture according to claim 2 wherein electrical conductor means extend through said channel.

4. A light fixture according to claim 3 wherein said channel is provided with electrical connecting means at opposite ends thereof, whereby the fixture and associated conductor carrying channel may be connected to other like units in series relation.

5. A light fixture according to claim 4 wherein the elongated channel extends above said end members and said frame centrally of said frame.

6. A light fixture according to claim 5 wherein said flanges are inclined downwardly.

7. A light fixture according to claim 6 wherein said brackets are mounted on the inner side of said side members in a location whereby the top portions are positioned below the top edge of said side members and said top portions are inclined inwardly and upwardly at angles corresponding to the angles of inclination of the flanged bottom portions of said channel member.

8. A light fixture according to claim 7 wherein said light-supporting socket means is mounted on the inside surface of said end members below said pockets.

9. A light fixture according to claim 8 wherein the acoustical panels are perforated.

10. A light fixture according to claim 9 wherein said side members are rectangularly shaped and said end members are greater in height at their central portion than the height of said side members, the upper edge of each of said end members having a flat central section and downwardly sloping sections on opposite sides thereof, said downwardly extending projections are flat and transversely positioned with respect to said channel bottom portion, said projections each having a centrally located, flat top edge portion, with edge portions sloping downwardly therefrom, said panels being supported in angular relationship to each other on said flanges, brackets and downwardly extending projections on said channel bottom, said elongated channel having a body portion of generally pentagonal cross-sectional shape.

References Cited

UNITED STATES PATENTS

| | | | |
|---|---|---|---|
| 890,193 | 6/1908 | Stonebridge | 240—36 |
| 2,632,096 | 3/1953 | Kochale et al. | 240—9 |
| 2,830,330 | 4/1958 | Heath. | |
| 3,019,333 | 1/1962 | Pascucci. | |
| 3,146,957 | 9/1964 | Totten. | |

NORTON ANSHER, *Primary Examiner.*

RICHARD M. SHEER, *Assistant Examiner.*